United States Patent [19]

Chow

[11] 4,412,554

[45] Nov. 1, 1983

[54] FIRE SAFE EXPANSIBLE TUBE TYPE VALVE

[75] Inventor: Peter C. M. Chow, Newark, Calif.

[73] Assignee: Grove Valve and Regulator Company, Oakland, Calif.

[21] Appl. No.: 288,107

[22] Filed: Jul. 29, 1981

[51] Int. Cl.³ ............................................. F16L 7/00
[52] U.S. Cl. ....................................... 137/375; 251/5; 251/61.1
[58] Field of Search ................... 251/5, 61.1; 137/375, 137/468; 384/277; 138/149; 277/22, 165

[56] References Cited

U.S. PATENT DOCUMENTS

| 3,371,677 | 3/1968 | Connolly | 251/5 |
| 3,425,439 | 2/1969 | Duffy et al. | 137/375 |
| 3,669,142 | 6/1972 | Gerbic | 251/5 |
| 3,858,618 | 1/1975 | Kaufman | 138/149 |

FOREIGN PATENT DOCUMENTS 205993 8/1979 Fed. Rep. of Germany ...... 138/149

Primary Examiner—Martin P. Schwadron
Assistant Examiner—Sheri M. Novack
Attorney, Agent, or Firm—Melvin R. Stidham

[57] ABSTRACT

An expansible tube type valve wherein a flexible tube, which is sealed around its ends in a valve body, is stretched to seal around a barrier in the flow passage. Thin rings of thermal insulation material are disposed around the ends of the flexible tube, interposed between it and parts of the valve body normally in contact therewith, so as to isolate the tube from the body and preclude transmission of high temperatures thereto, as in the event of a fire in the area.

2 Claims, 1 Drawing Figure

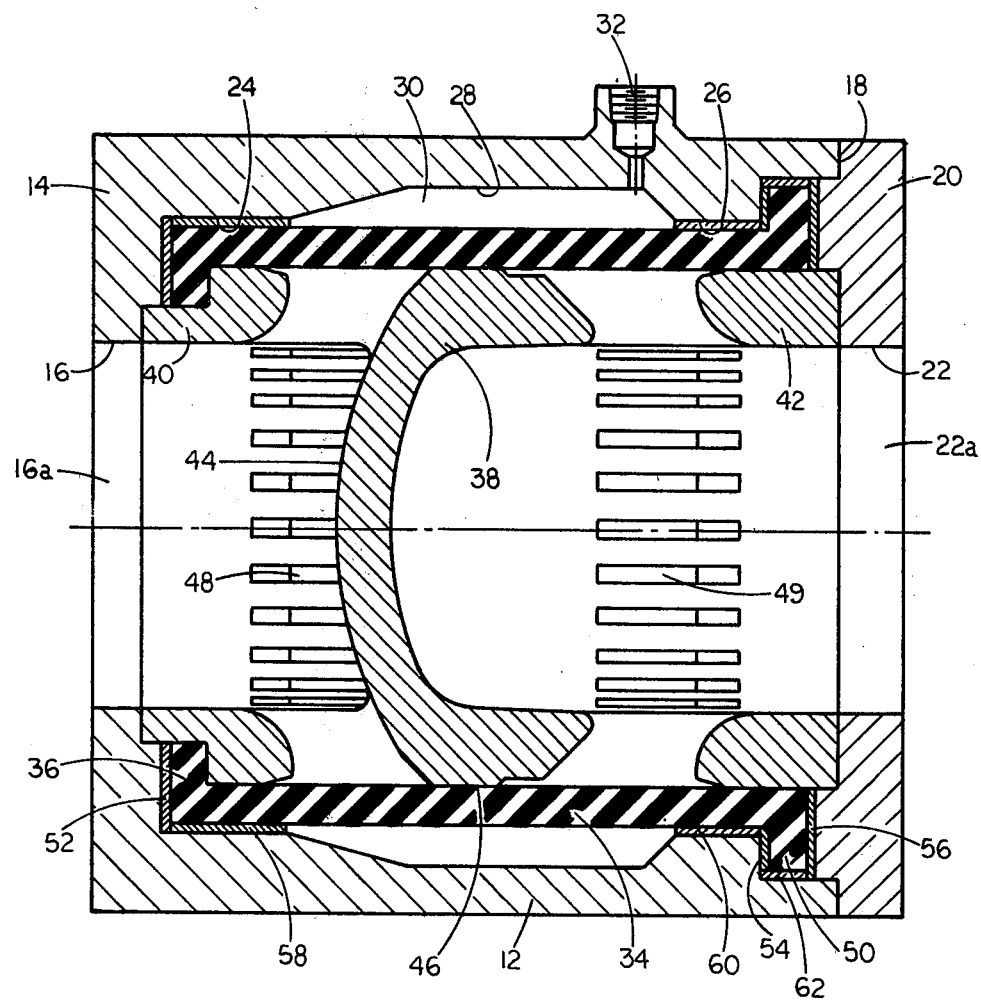
FIG.-1-

FIRE SAFE EXPANSIBLE TUBE TYPE VALVE

BACKGROUND OF THE INVENTION

Many types of valves, such as ball valves, butterfly valves, gate valves and the like, which normally seal by means of an elastomer seal ring, have provision for metal-to-metal back-up seals which take over in the event that the main, elastomer seal is destroyed by fire or intense heat. In the case of an expansible tube type valve, such as that shown in Gerbic U.S. Pat. No. 3,669,142 granted June 13, 1972, the seal medium is an elastomer tube and, in the event that the tube is destroyed, the entire sealing medium is lost. In the event that the fire occurs in the pipeline in which the expansible tube valve is installed, and flames enter the housing of the expansible tube valve, there is little that can be done to prevent destruction of the seal. However, valves of this type are frequently used in refineries, pumping stations and the like where a fire, generating intense heat could occur in a nearby pressure vessel or pipeline other than that in which the expansible tube valve is installed. Such fires could heat the metal of the valve body to a level that destroys or damages the expansible tube, even though the fire does not impinge directly upon the tube itself.

OBJECTS OF THE INVENTION

It is an object of this invention to provide an expansible tube valve which will maintain an effective seal even though the housing in which it is carried is subjected to intense heat from an external source.

It is a further object of this invention to provide means for protecting the flexible tube of an expansible tube type valve from high temperatures transmitted by the valve body.

Other objects and advantages of this invention will become apparent from the description to follow, particularly when read in conjunction with the accompanying drawing.

SUMMARY OF THE INVENTION

In carrying out this invention there is provided a conventional flexible tube type valve having a cylindrical housing and a cylindrical, slotted core or cage with a central barrier across it and a flexible tube stretched over it. When upstream pressure overcomes a control pressure in a jacket around the tube, the tube is stretched radially outward from the seating surface around the central barrier to enable flow around the barrier. The flexible tube is normally provided with flanges at opposite ends, which are squeezed between metallic valve components to effect seals at both ends of the flexible tube. This invention contemplates the provision of flat rings of asbestos or other suitable heat insulation material interposed between the sides of the tube flanges and the housing end closures, and flat cylindrical rings interposed between cylindrical surfaces of the tube and the inner cylindrical surface of the valve body. Hence, the flexible tube is insulated from the valve body, and heat to which the valve body may be subjected is not transmitted to the tube.

BRIEF DESCRIPTION OF THE DRAWING

The drawing is a vertical section view through a flexible tube type valve embodying features of this invention.

DESCRIPTION OF A PREFERRED EMBODIMENT

Referring now to the drawing with greater particularity, the expansible tube valve 10 of this invention comprises a generally cylindrical body 12 having an integral upstream end wall 14 with a circular opening 16 forming an upstream flow passage 16a. The housing 12 is open at the downstream end 18 to receive an end closure 20 having circular opening 22 therein forming a downstream flow passage 22a. The end closure 20 is secured to the valve body by any suitable means, such as bolts (not shown).

The valve housing has generally cylindrical inner surfaces 24 and 26 near its upstream and downstream ends 14 and 18, respectively, and then the inner surface is enlarged at 28 to form a pressure control jacket 30 to which a fluid at predetermined pressure is delivered at jacket boss 32.

A flexible tube 34 having an inturned upstream flange 36 is carried on and stretched over a slotted cylindrical core or cage 38 having imperforate annular end portions 40 and 42 and a central circular barrier or dam 44 with a generally cylindrical sealing surface 46 around it. On both sides of the central barrier 44 are annular rows of upstream and downstream slots 48 and 49.

The cylindrical core 38, and flexible tube 34, are installed as a unit into the valve housing 12 so that the inturned flange effects a seal between the upstream annular portion 40 of the core 38 and the integral end wall 14. Then, the downstream closure 20 is fixed in place to effect a seal between it and the housing 12 by squeezing an outturned flange 50 on the flexible tube 34.

In operation, the control jacket 30 is loaded to a predetermined pressure and, when the upstream pressure in the upstream passage 16 overcomes the control pressure, the flexible tube 34 is stretched outward to enable flow through the slots 48, around the barrier 44 back through the slots 49 and out the downstream flow passage 22a.

As a particular feature of this invention, I provide thin flat rings 52 between the side of the upstream flange 36 and the housing end wall 14, and a pair of rings 54 and 56 on both sides of the downstream outturned flange, isolating it from the housing 12, and the removable end closure 20, respectively. Additional, flat short cylindrical rings 58 and 60 of the heat insulating material are interposed between the outer surface of the flexible tube 34 and the inner surfaces 24 and 26 of the valve body 12. Another short cylindrical ring 62 is provided between the cylindrical outer surface of the outturned flange 56 and the valve body 12. Hence, the flat rings 52, 54 and 56, and the cylindrical rings 58, 60 and 62, insulate the flexible tube 34 from contact with the valve body 12, including the integral and removable end closures 14 and 20, so that heat transmitted to the valve body 12 and closure 20 is not transmitted to the flexible tube 34, leaving it isolated from contact with the hot surfaces of the valve 10.

Since the slotted cage 38 is in contact with the valve body 12, and particularly the fixed and removable end closures 14 and 20, it may also be desirable to put insulating rings between the flexible tube and the cage. However, tests have shown that, at extremely high temperatures, there is little or no damage that occurs to the inner surface of the flexible tube wherein contacts the slot in cage 38. Accordingly, it is believed that such insulation is probably unnecessary.

While this invention has been described in conjunction with a preferred embodiment thereof, it is obvious that modifications and changes therein may be made by those skilled in the art to which it pertains without departing from the spirit and scope of this invention, as defined by the claims appended thereto.

What is claimed as invention is:

1. An expansible tue valve comprising:
   a valve body;
   end closures on said body defining inlet and outlet passageways;
   a generally cylindrical slotted core within said body with annular end portions, a circular barrier extending across said core intermediate said end portions with a sealing surface around it, and flow slots through and around said core on both sides of said barrier;
   a flexible, expansible tube around said core snugly embracing said sealing surface;
   a pair of cylindrical inner surfaces near the ends of said body closely embracing said expansible tube;
   intermediate inner surfaces of said body being in spaced relationship to said tube to enable radial expansion thereof;
   one of said cylindrical inner surfaces terminating in an outward facing shoulder; and
   an out-turned integral radial flange around one end of said tube clamped between said shoulder and an end closure to form a seal therewith; said valve being characterized in the provision of means for protecting said expansible tube form external heat comprising:
   a pair of thin tubular rings of heat insulation material in said body, each coextensive with one of said cylindrical inner surfaces and interposed between said one cylindrical surface and said expansible tube;
   a third tubular ring of heat insulation material coextensive with the edge of said out-turned flange and interposed between said edge and said valve body; and
   flat rings of heat insulation material in said body interposed between the sides of said radial flanges and said shoulder and end closure, respectively.

2. The expansible tube valve defined by claim 1 characterized in that there is an in-turned radial flange on the other end of said expansible tube clamped between a radial shoulder on said core and an end closure; characterized is that there is:
   a third flat ring of heat insulation material, interposed between the outer side of said in-turned radial flange and said end closure.

* * * * *